United States Patent
Fritz et al.

(10) Patent No.: US 11,154,892 B2
(45) Date of Patent: Oct. 26, 2021

(54) COATING DEVICE FOR APPLYING COATING AGENT IN A CONTROLLED MANNER

(71) Applicant: Dürr Systems AG, Bietigheim-Bissingen (DE)

(72) Inventors: Hans-Georg Fritz, Ostfildern (DE); Benjamin Wöhr, Eibensbach (DE); Marcus Kleiner, Besigheim (DE); Moritz Bubek, Ludwigsburg (DE); Timo Beyl, Besigheim (DE); Frank Herre, Oberriexingen (DE); Steffen Sotzny, Oberstenfeld (DE)

(73) Assignee: DÜRR SYSTEMS AG, Bietigheim-Bissingen (DE)

( * ) Notice: Subject to any disclaimer, the term of this patent is extended or adjusted under 35 U.S.C. 154(b) by 0 days.

(21) Appl. No.: 16/468,696

(22) PCT Filed: Dec. 1, 2017

(86) PCT No.: PCT/EP2017/081098
§ 371 (c)(1),
(2) Date: Jun. 12, 2019

(87) PCT Pub. No.: WO2018/108562
PCT Pub. Date: Jun. 21, 2018

(65) Prior Publication Data
US 2019/0337001 A1 Nov. 7, 2019

(30) Foreign Application Priority Data
Dec. 14, 2016 (DE) ...................... 10 2016 014 956.6

(51) Int. Cl.
*B05B 12/08* (2006.01)
*B05C 11/10* (2006.01)
(Continued)

(52) U.S. Cl.
CPC .......... *B05B 12/087* (2013.01); *B05B 1/3093* (2013.01); *B05B 12/085* (2013.01);
(Continued)

(58) Field of Classification Search
CPC ............... B05C 11/1002; B05B 12/085; B05B 13/0431; B25J 11/0075
See application file for complete search history.

(56) References Cited

U.S. PATENT DOCUMENTS

| | | |
|---|---|---|
| 3,421,694 A | 1/1969 | Muller |
| 3,717,306 A | 2/1973 | Hushon et al. |

(Continued)

FOREIGN PATENT DOCUMENTS

| | | |
|---|---|---|
| CN | 2287527 Y | 8/1998 |
| CN | 1331661 A | 1/2002 |

(Continued)

OTHER PUBLICATIONS

Lipták, Béla. (2006). Instrument Engineers' Handbook (4th Edition)—Process Control and Optimization, vol. 2-2.1.3.5 Process Time Constant, (pp. 99-102). Taylor & Francis. Retrieved from https://app.knovel.com/hotlink/pdf/id:ktOOCC7HL1/instrument-engineers/process-time-constant (Year: 2006).*

(Continued)

*Primary Examiner* — Binu Thomas
(74) *Attorney, Agent, or Firm* — Bejin Bieneman PLC (57) ABSTRACT

The disclosure concerns a coating device for coating components with a coating agent, in particular for painting motor vehicle body components with a paint, with a printhead for applying the coating agent to the component, and with a coating agent supply for supplying the printhead with the coating agent to be applied, wherein the coating agent flows from the coating agent supply to the printhead at a specific coating agent pressure and a specific flow rate. The disclo- (Continued)

sure provides that the coating supply will control the coating agent pressure and/or the flow rate of the coating agent. Furthermore, the disclosure includes an associated operating method.

20 Claims, 6 Drawing Sheets

(51) Int. Cl.
    *B05C 5/02*     (2006.01)
    *B25J 11/00*     (2006.01)
    *B41J 3/407*     (2006.01)
    *B05B 1/30*     (2006.01)
    *B05B 12/14*     (2006.01)
    *B05B 13/04*     (2006.01)

(52) U.S. Cl.
    CPC ........ *B05B 12/149* (2013.01); *B05B 13/0431* (2013.01); *B05C 5/027* (2013.01); *B05C 5/0291* (2013.01); *B05C 11/1002* (2013.01); *B05C 11/1013* (2013.01); *B05C 11/1018* (2013.01); *B05C 11/1047* (2013.01); *B25J 11/0075* (2013.01); *B41J 3/4073* (2013.01); *B05B 13/0452* (2013.01)

(56) References Cited

U.S. PATENT DOCUMENTS

| | | |
|---|---|---|
| 3,981,320 A | 9/1976 | Wiggins |
| 4,141,231 A | 2/1979 | Kudlich |
| 4,375,865 A | 3/1983 | Springer |
| 4,383,264 A | 5/1983 | Lewis |
| 4,423,999 A | 1/1984 | Choly |
| 4,430,010 A | 2/1984 | Zrenner et al. |
| 4,435,719 A * | 3/1984 | Snaper ................ B41J 2/04 347/82 |
| 4,478,241 A | 10/1984 | Cardenas-Franco |
| 4,555,719 A | 11/1985 | Arway et al. |
| 4,668,948 A | 5/1987 | Merkel |
| 4,734,711 A | 3/1988 | Piatt et al. |
| 4,826,135 A | 5/1989 | Mielke |
| 4,894,252 A | 1/1990 | Bongen et al. |
| 4,941,778 A | 7/1990 | Lehmann |
| 4,974,780 A | 12/1990 | Nakamura et al. |
| 4,985,715 A | 1/1991 | Cyphert et al. |
| 5,050,533 A | 9/1991 | Zaber |
| 5,072,881 A | 12/1991 | Taube, III |
| 5,429,682 A | 7/1995 | Harlow, Jr. et al. |
| 5,435,884 A | 7/1995 | Simmons et al. |
| 5,538,221 A | 7/1996 | Joswig |
| 5,556,466 A | 9/1996 | Martin et al. |
| 5,602,575 A | 2/1997 | Pauly |
| 5,636,795 A | 6/1997 | Sedgwick et al. |
| 5,647,542 A | 7/1997 | Diana |
| 5,659,347 A | 8/1997 | Taylor |
| 5,681,619 A | 10/1997 | Ogasawara |
| 5,740,967 A | 4/1998 | Simmons et al. |
| 5,843,515 A | 12/1998 | Crum et al. |
| 5,951,882 A | 9/1999 | Simmons et al. |
| 5,964,407 A | 10/1999 | Sandkleiva |
| 5,976,343 A | 11/1999 | Schlaak |
| 6,179,217 B1 | 1/2001 | Yoshida et al. |
| 6,540,835 B2 | 4/2003 | Kim et al. |
| 6,607,145 B1 | 8/2003 | Boriani et al. |
| 6,641,667 B2 | 11/2003 | Ochiai et al. |
| 6,712,285 B2 | 3/2004 | Provenaz et al. |
| 6,777,032 B2 | 8/2004 | Ogasahara et al. |
| 6,811,807 B1 | 11/2004 | Zimmermann et al. |
| 6,849,684 B2 | 2/2005 | Poppe et al. |
| 7,160,105 B2 | 1/2007 | Edwards |
| 7,178,742 B2 | 2/2007 | Nellentine et al. |
| 7,182,815 B2 | 2/2007 | Katagami et al. |
| 7,244,310 B2 | 7/2007 | Edwards |
| 7,270,712 B2 | 9/2007 | Edwards |
| 7,357,959 B2 | 4/2008 | Bauer |
| 7,387,071 B2 | 6/2008 | Heinke et al. |
| 7,449,070 B2 | 11/2008 | Fellingham |
| 7,604,333 B2 | 10/2009 | Horsnell |
| 7,757,632 B2 | 7/2010 | Edwards |
| 7,837,071 B2 | 11/2010 | Achrainer |
| 7,901,741 B2 | 3/2011 | Katagami et al. |
| 8,028,651 B2 | 10/2011 | Rademacher et al. |
| 8,118,385 B2 | 2/2012 | Van De Wynckel et al. |
| 8,449,087 B2 | 5/2013 | Kataoka et al. |
| 8,545,943 B2 | 10/2013 | Frankenberger et al. |
| 8,652,581 B2 | 2/2014 | Merchant |
| 8,678,535 B2 | 3/2014 | Beier et al. |
| 8,875,655 B2 | 11/2014 | Pettersson et al. |
| 8,882,242 B2 | 11/2014 | Beier et al. |
| 9,108,424 B2 | 8/2015 | Wallsten et al. |
| 9,140,247 B2 | 9/2015 | Herre et al. |
| 9,156,054 B2 | 10/2015 | Ikushima |
| 9,266,353 B2 | 2/2016 | Beier et al. |
| 9,393,787 B2 | 7/2016 | Ikushima |
| 9,464,573 B2 | 10/2016 | Remy et al. |
| 9,592,524 B2 | 3/2017 | Fritz et al. |
| 9,701,143 B2 | 7/2017 | Ikushima |
| 9,707,585 B2 | 7/2017 | Reimert et al. |
| 9,844,792 B2 | 12/2017 | Pettersson et al. |
| 9,901,945 B2 | 2/2018 | Fehr et al. |
| 9,914,150 B2 | 3/2018 | Pettersson et al. |
| 10,016,977 B2 | 7/2018 | Stefani et al. |
| 10,105,946 B2 | 10/2018 | Nakamura et al. |
| 10,150,304 B2 | 12/2018 | Herre et al. |
| 10,252,552 B2 | 4/2019 | Pitz et al. |
| 10,272,677 B2 | 4/2019 | Stefani et al. |
| 10,532,569 B2 | 1/2020 | Wallsten et al. |
| 2001/0017085 A1 | 8/2001 | Kubo et al. |
| 2001/0019340 A1 | 9/2001 | Kubo et al. |
| 2002/0024544 A1 | 2/2002 | Codos |
| 2002/0043280 A1 | 4/2002 | Ochiai et al. |
| 2002/0043567 A1 | 4/2002 | Provenaz et al. |
| 2002/0105688 A1 | 8/2002 | Katagami et al. |
| 2002/0128371 A1 | 9/2002 | Poppe et al. |
| 2003/0020783 A1 | 1/2003 | Sanada |
| 2003/0041884 A1 * | 3/2003 | Bahr ................ B05B 15/55 134/22.12 |
| 2003/0049383 A1 | 3/2003 | Ogasahara et al. |
| 2004/0028830 A1 | 2/2004 | Bauer |
| 2004/0089234 A1 * | 5/2004 | Hagglund ............ B05B 12/085 118/663 |
| 2004/0123159 A1 | 6/2004 | Kerstens |
| 2004/0173144 A1 | 9/2004 | Edwards |
| 2004/0221804 A1 | 11/2004 | Zimmermann et al. |
| 2004/0231594 A1 | 11/2004 | Edwards |
| 2004/0238522 A1 | 12/2004 | Edwards |
| 2004/0256501 A1 | 12/2004 | Mellentine |
| 2004/0261700 A1 | 12/2004 | Edwards |
| 2005/0000422 A1 | 1/2005 | Edwards |
| 2005/0015050 A1 | 1/2005 | Mowery et al. |
| 2005/0016451 A1 | 1/2005 | Edwards |
| 2005/0023367 A1 | 2/2005 | Reighard et al. |
| 2005/0243112 A1 | 11/2005 | Kobayashi et al. |
| 2006/0061613 A1 | 3/2006 | Fienup et al. |
| 2006/0068109 A1 | 3/2006 | Frankenberger et al. |
| 2006/0146379 A1 | 7/2006 | Katagami et al. |
| 2006/0238587 A1 | 10/2006 | Horsnell |
| 2006/0251796 A1 | 11/2006 | Fellingham |
| 2007/0062383 A1 * | 3/2007 | Gazeau ................ B41J 25/308 101/35 |
| 2007/0292626 A1 | 12/2007 | Larsson et al. |
| 2008/0271674 A1 * | 11/2008 | Rademacher ........... B05B 15/58 118/707 |
| 2008/0309698 A1 | 12/2008 | Nakano et al. |
| 2009/0027433 A1 | 1/2009 | Van De Wynckel et al. |
| 2009/0029069 A1 | 1/2009 | Edwards |
| 2009/0181182 A1 | 7/2009 | Sloan |
| 2010/0132612 A1 | 6/2010 | Achrainer |
| 2010/0156970 A1 | 6/2010 | Ikushima |
| 2010/0170918 A1 | 7/2010 | Achrainer |
| 2010/0279013 A1 | 11/2010 | Frankenberger et al. |
| 2010/0282283 A1 | 11/2010 | Bauer |

(56) References Cited

U.S. PATENT DOCUMENTS

| | | | |
|---|---|---|---|
| 2010/0321448 | A1 | 12/2010 | Buestgens et al. |
| 2011/0014371 | A1* | 1/2011 | Herre .................. B25J 11/00 |
| | | | 118/317 |
| 2011/0084150 | A1 | 4/2011 | Merchant |
| 2011/0248046 | A1 | 10/2011 | Simion |
| 2011/0262622 | A1 | 10/2011 | Herre |
| 2012/0085842 | A1 | 4/2012 | Ciardella |
| 2012/0105522 | A1 | 5/2012 | Wallsten |
| 2012/0114849 | A1* | 5/2012 | Melcher ................ B05B 15/55 |
| | | | 118/311 |
| 2012/0162331 | A1 | 6/2012 | Kataoka |
| 2012/0186518 | A1 | 7/2012 | Herre |
| 2012/0219699 | A1 | 8/2012 | Pettersson et al. |
| 2012/0249679 | A1 | 10/2012 | Beier et al. |
| 2012/0282405 | A1 | 11/2012 | Herre |
| 2013/0201243 | A1 | 8/2013 | Yoshida |
| 2013/0215203 | A1 | 8/2013 | Chen |
| 2013/0257984 | A1 | 10/2013 | Beier et al. |
| 2013/0284833 | A1 | 10/2013 | Fritz et al. |
| 2014/0076985 | A1 | 3/2014 | Pettersson et al. |
| 2014/0242285 | A1 | 8/2014 | Pettersson et al. |
| 2015/0009254 | A1 | 1/2015 | Kaiba et al. |
| 2015/0042716 | A1 | 2/2015 | Beier et al. |
| 2015/0086723 | A1 | 3/2015 | Bustgens |
| 2015/0098028 | A1 | 4/2015 | Ohnishi |
| 2015/0328654 | A1 | 11/2015 | Schwab |
| 2015/0375258 | A1 | 12/2015 | Fritz et al. |
| 2015/0375507 | A1 | 12/2015 | Ikushima |
| 2016/0052312 | A1 | 2/2016 | Pitz et al. |
| 2016/0074822 | A1 | 3/2016 | Han |
| 2016/0288552 | A1 | 10/2016 | Ikushima |
| 2016/0306364 | A1 | 10/2016 | Ikushima et al. |
| 2017/0087837 | A1 | 3/2017 | Stefani et al. |
| 2017/0106393 | A1 | 4/2017 | Hampson et al. |
| 2017/0136481 | A1 | 5/2017 | Fritz et al. |
| 2017/0252765 | A1* | 9/2017 | Medard ............... B05B 13/0452 |
| 2017/0267002 | A1 | 9/2017 | Pitz et al. |
| 2017/0299088 | A1 | 10/2017 | Rau |
| 2017/0361346 | A1 | 12/2017 | Lahidjanian et al. |
| 2018/0022105 | A1 | 1/2018 | Nakamura et al. |
| 2018/0056670 | A1 | 3/2018 | Kerr |
| 2018/0093491 | A1* | 4/2018 | Murayama ............ B05B 15/40 |
| 2018/0178505 | A1 | 6/2018 | Stefani et al. |
| 2018/0222186 | A1 | 8/2018 | Stefani et al. |
| 2018/0250955 | A1 | 9/2018 | Herre |
| 2019/0091712 | A1 | 3/2019 | Medard et al. |

FOREIGN PATENT DOCUMENTS

| | | |
|---|---|---|
| CN | 1438942 A | 8/2003 |
| CN | 1512919 A | 7/2004 |
| CN | 1176815 C | 11/2004 |
| CN | 1668386 A | 9/2005 |
| CN | 1761530 A | 4/2006 |
| CN | 101264698 A | 9/2008 |
| CN | 101309755 A | 11/2008 |
| CN | 101657264 A | 2/2010 |
| CN | 101784348 A | 7/2010 |
| CN | 102177002 A | 9/2011 |
| CN | 102198434 A | 9/2011 |
| CN | 102971080 A | 3/2013 |
| CN | 103153483 A | 6/2013 |
| CN | 103909743 A | 7/2014 |
| CN | 104613205 A | 5/2015 |
| CN | 104994966 A | 10/2015 |
| CN | 105358259 A | 2/2016 |
| CN | 106414081 A | 2/2017 |
| DE | 1284250 A | 11/1968 |
| DE | 7710895 U1 | 9/1977 |
| DE | 3045401 A1 | 7/1982 |
| DE | 3221327 A1 | 9/1983 |
| DE | 3225554 A1 | 1/1984 |
| DE | 3634747 A1 | 8/1987 |
| DE | 3804092 A1 | 9/1988 |
| DE | 4115111 A1 | 11/1991 |
| DE | 4138491 A1 | 5/1993 |
| DE | 9405600 U1 | 6/1994 |
| DE | 68924202 T2 | 2/1996 |
| DE | 19606716 C1 | 8/1997 |
| DE | 19630290 A1 | 1/1998 |
| DE | 19731829 A1 | 1/1999 |
| DE | 19743804 A1 | 4/1999 |
| DE | 9422327 U1 | 3/2000 |
| DE | 19852079 A1 | 5/2000 |
| DE | 19936790 A1 | 2/2001 |
| DE | 20017629 U1 | 3/2001 |
| DE | 10048749 A1 | 4/2002 |
| DE | 69429354 T2 | 5/2002 |
| DE | 69622407 T2 | 3/2003 |
| DE | 10307719 A1 | 9/2003 |
| DE | 60001898 T2 | 2/2004 |
| DE | 102004021223 A1 | 12/2004 |
| DE | 10331206 A1 | 1/2005 |
| DE | 102004034270 A1 | 2/2006 |
| DE | 102004044655 A1 | 3/2006 |
| DE | 102004049471 A1 | 4/2006 |
| DE | 60212523 T2 | 2/2007 |
| DE | 69836128 T2 | 8/2007 |
| DE | 60125369 T2 | 10/2007 |
| DE | 102006021623 A1 | 11/2007 |
| DE | 102006056051 A1 | 5/2008 |
| DE | 102007018877 A1 | 10/2008 |
| DE | 102007037663 A1 | 2/2009 |
| DE | 10 2008 018 881 A1 | 9/2009 |
| DE | 102008053178 A1 | 5/2010 |
| DE | 102009029946 A1 | 12/2010 |
| DE | 102009038462 A1 | 3/2011 |
| DE | 102010004496 A1 | 7/2011 |
| DE | 102010019612 A1 | 11/2011 |
| DE | 102012006371 A1 | 7/2012 |
| DE | 102012005087 A1 | 10/2012 |
| DE | 102012005650 A1 | 9/2013 |
| DE | 102012212469 A | 1/2014 |
| DE | 102012109123 A1 | 3/2014 |
| DE | 202013101134 U1 | 6/2014 |
| DE | 102013002412 A1 | 8/2014 |
| DE | 102013011107 A1 | 8/2014 |
| DE | 102013205171 A1 | 9/2014 |
| DE | 102014006991 A1 | 12/2014 |
| DE | 102014007523 A1 | 11/2015 |
| DE | 102014008183 A1 | 12/2015 |
| DE | 102014012705 A1 | 3/2016 |
| DE | 102014013158 A1 | 3/2016 |
| EP | 0138322 A1 | 4/1985 |
| EP | 0297309 A2 | 1/1989 |
| EP | 0665106 A2 | 8/1995 |
| EP | 1120258 A2 | 8/2001 |
| EP | 1764226 A1 | 3/2007 |
| EP | 1852733 A1 | 11/2007 |
| EP | 1884365 A1 | 2/2008 |
| EP | 1946846 A2 | 7/2008 |
| EP | 2002898 A1 | 12/2008 |
| EP | 2133154 A2 | 12/2009 |
| EP | 2151282 A1 | 2/2010 |
| EP | 2196267 A2 | 6/2010 |
| EP | 2380744 A2 | 10/2011 |
| EP | 2433716 A1 | 3/2012 |
| EP | 2468512 A1 | 6/2012 |
| EP | 2641661 A1 | 9/2013 |
| EP | 2644392 A2 | 10/2013 |
| EP | 2777938 A1 | 9/2014 |
| EP | 2799150 A1 | 11/2014 |
| EP | 2842753 A1 | 3/2015 |
| EP | 3002128 A2 | 4/2016 |
| EP | 3156138 A1 | 4/2017 |
| EP | 3213823 A1 | 9/2017 |
| EP | 3257590 A1 | 12/2017 |
| EP | 3272669 A1 | 1/2018 |
| EP | 3068626 B1 | 10/2019 |
| FR | 3010918 A1 | 3/2015 |
| GB | 2200433 A | 8/1988 |
| GB | 2367771 A | 4/2002 |
| GB | 2507069 A | 4/2014 |

(56) References Cited

FOREIGN PATENT DOCUMENTS

| | | |
|---|---|---|
| JP | S5722070 A | 2/1982 |
| JP | S62116442 A | 5/1987 |
| JP | H04-106669 U | 9/1992 |
| JP | H0798171 B2 | 10/1995 |
| JP | H09192583 A | 7/1997 |
| JP | 2000158670 A | 6/2000 |
| JP | 2000317354 A | 11/2000 |
| JP | 2001129456 A | 5/2001 |
| JP | 2001157863 A | 6/2001 |
| JP | 2001239652 A | 9/2001 |
| JP | 2001300404 A | 10/2001 |
| JP | 2002361863 A | 12/2002 |
| JP | 2003506210 A | 2/2003 |
| JP | 2003136030 A | 5/2003 |
| JP | 2004142382 A | 5/2004 |
| JP | 2005526234 A | 9/2005 |
| JP | 2007021760 A | 2/2007 |
| JP | 2007152666 A | 6/2007 |
| JP | 2007520340 A | 7/2007 |
| JP | 2007245633 A | 9/2007 |
| JP | 2007289848 A | 11/2007 |
| JP | 2010531213 A | 9/2010 |
| JP | 2010531729 A | 9/2010 |
| JP | 2010241003 A | 10/2010 |
| JP | 2011206958 A | 10/2011 |
| JP | 2012506305 A | 3/2012 |
| JP | 2012135925 A | 7/2012 |
| JP | 2012206116 A | 10/2012 |
| JP | 2012228643 A | 11/2012 |
| JP | 2012228660 | 11/2012 |
| JP | 2013067179 A | 4/2013 |
| JP | 2013530816 A | 8/2013 |
| JP | 2013530816 B2 | 8/2013 |
| JP | 2013188706 A | 9/2013 |
| JP | 2014019140 A | 2/2014 |
| JP | 2014050832 A | 3/2014 |
| JP | 2014111307 A | 6/2014 |
| JP | 2015-009222 A | 1/2015 |
| JP | 2015096322 A | 5/2015 |
| JP | 2015520011 A | 7/2015 |
| JP | 2015193129 A | 11/2015 |
| JP | 2016507372 A | 3/2016 |
| JP | 2016526910 A | 9/2016 |
| JP | 2016175077 A | 10/2016 |
| JP | 2016175662 A | 10/2016 |
| JP | 2018012065 A | 1/2018 |
| JP | 2020513311 A | 5/2020 |
| JP | 2020513314 A | 5/2020 |
| WO | 8601775 A1 | 3/1986 |
| WO | 9856585 A1 | 12/1998 |
| WO | 02098576 A1 | 12/2002 |
| WO | 03021519 A1 | 3/2003 |
| WO | 2003062129 A2 | 7/2003 |
| WO | 2004048112 A1 | 6/2004 |
| WO | 2004085738 A2 | 10/2004 |
| WO | 2005016556 A1 | 2/2005 |
| WO | 2005075170 A1 | 8/2005 |
| WO | 2006022217 A1 | 3/2006 |
| WO | 2007121905 A1 | 11/2007 |
| WO | 2009019036 A1 | 2/2009 |
| WO | 2010046064 A1 | 4/2010 |
| WO | 2010146473 A1 | 12/2010 |
| WO | 2011044491 A1 | 4/2011 |
| WO | 2011128439 A1 | 10/2011 |
| WO | 2011138048 A1 | 11/2011 |
| WO | 2013121565 A1 | 8/2013 |
| WO | 2015071270 A1 | 5/2015 |
| WO | 2015096322 A1 | 7/2015 |
| WO | 2015186014 A1 | 12/2015 |
| WO | 2016-087016 A1 | 6/2016 |
| WO | 2016142510 A1 | 9/2016 |
| WO | 2016145000 A1 | 9/2016 |
| WO | 2017006245 A1 | 1/2017 |
| WO | 2017006246 A1 | 1/2017 |
| WO | 2018102846 A1 | 6/2018 |

OTHER PUBLICATIONS

Liptak, Bela. (2006). Instrument Engineers' Handbook (4th Edition)—Process Control and Optimization, vol. 2-2.1.3.5 Process Time Constant, (pp. 99-102). Taylor & Francis. Retrieved from https://app.knovel.com/hotlink/pdf/id:kt00CC7HL1/instrument-engineers/process-time-constant (Year: 2006) (Year: 2006).*
European Search Report for EP20170638.9 dated Sep. 14, 2020 (4 pages—English translation not available).
European Search Report for EP20170021.8 dated Sep. 8, 2020 (11 pages—English translation not available).
European Search Report for EP20170025.9 dated Sep. 9, 2020 (4 pages—English translation not available).
European Search Report for EP20170016.8 dated Sep. 7, 2020 (4 pages—English translation not available).
Chinese Office Action and Search Report for CN201780077603.3 dated Oct. 12, 2020 (15 pages; English translation not available).
Chinese Office Action for Application No. CN20178007017.9 dated Aug. 31, 2020 (8 pages; with English translation).
Non Final Office Action for U.S. Appl. No. 16/468,697 dated Oct. 22, 2020 (78 pages).
Non Final Office Action for U.S. Appl. No. 16/468,700 dated Dec. 1, 2020 (73 pages).
Non Final Office Action for U.S. Appl. No. 16/468,689 dated Oct. 15, 2020 (77 pages).
Chinese Office Action for CN201780077476.7 dated Sep. 23, 2020 (12 pages; English translation not available).
EPO Examination Report for Application No. 201702818.1 dated Dec. 18, 2020 (with English machine translation; 6 pages).
Non-Final Office Action dated Feb. 5, 2021 for U.S. Appl. No. 16/468,701 (80 pages).
Non-Final Office Action dated Feb. 18, 2021 for U.S. Appl. No. 16/468,692 (97 pages).
Non-Final Office Action for U.S. Appl. No. 16/468,691 dated Jan. 7, 2021 (79 pages).
JPO Submission for JP2019-531096; submitted Dec. 21, 2020 (32 pages; with English translation).
JPO Submission for JP2019-531957; submitted Dec. 21, 2020 (21 pages; with English translation).
Non-Final Office Action dated Apr. 28, 2021 for U.S. Appl. No. 16/468,693 (109 pages).
Final Office Action dated Apr. 19, 2021 for U.S. Appl. No. 16/468,700 (62 pages).
Ghasem, G. et al; "Chapter 2 Background on Sprays and Their Production", Industrial Sprays and Atomization: Design, Analysis and Applications, Jan. 1, 2002, Springer, London, pp. 7-33, XP009195118, ISBN: 978-1-4471-3816-7.
International Search Report and Written Opinion for PCT/EP2017/081141 dated Feb. 26, 2018 (17 pages; with English translation).
International Search Report and Written Opinion for PCT/EP2017/081114 dated May 15, 2018 (33 pages; with English translation).
Anonymous: "Roboterkalibrierung—Wikipedia", Nov. 7, 2016, XP055471615, Gefunden im Internet: URL: https://de.wikipedia.org/w/index.php?title=Roboterkalibrierung&oldid=159460756 [gefunden am Apr. 30, 2018] das ganze dockument (8 pages; with English translation).
Beyer, Lukas: "Genauigkeitssteigerung von Industrierobotern", Forschungsberichte Aus Dem Laboratorium Fertigungstechnik/Helmut-Schmidt-Universitat, Universitat Der Bundeswehr Hamburg, Dec. 31, 2005, Seiten 1-4, XP009505118; ISSN: 1860-2886; ISBN: 978-3-8322-3681-6 (13 pages; with English machine translation).
International Search Report and Written Opinion for PCT/EP2017/081108 dated Feb. 28, 2018 (with English translation; 18 pages).
International Search Report and Written Opinion for PCT/EP2017/081099 dated Feb. 26, 2018 (21 pages; with English translation).
International Search Report and Written Opinion for PCT/EP2017/081102 dated Mar. 14, 2018 (16 pages; with English translation).
International Search Report and Written Opinion for PCT/EP2017/081105 dated Feb. 26, 2018 (19 pages; with English translation).
International Search Report and Written Opinion for PCT/EP2017/081152 dated May 15, 2018 (25 pages; with English translation).

(56) References Cited

OTHER PUBLICATIONS

International Search Report and Written Opinion for PCT/EP2017/081098 dated May 14, 2018 (26 pages; with English translation).
International Search Report and Written Opinion for PCT/EP2017/081101 dated Feb. 28, 2018 (14 pages; with English translation).
International Search Report and Written Opinion for PCT/EP2017/081121 dated Feb. 26, 2018 (20 pages; with English translation).
International Search Report and Written Opinion for PCT/EP2017/081117 dated Mar. 12, 2018 (27 pages; with English translation).
International Search Report and Written Opinion for PCT/EP2017/081123 dated Feb. 26, 2018 (20 pages; with English translation).
EPO Official Notification of Opposition for Application No. 17821803.8 dated Feb. 10, 2021 (64 pages; with English machine translation).
Notice of Allowance dated in U.S. Appl. No. 16/468,689 dated Jun. 2, 2021 (38 pages).
Fianl Office Action dated May 13, 2021 for U.S. Appl. No. 16/468,691 (70 pages).
Final Office Action dated Jun. 11, 2021 for U.S. Appl. No. 16/468,701 (53 pages).
China National Intellectual Property Administration Office Action and Search Report for CN Application No. 201780077018.3 dated Aug. 27, 2020 (11 pages; Search Report in English).
JPO Notification of Reasons for Rejection for Application No. JP2019-532030 dated May 18, 2021 (6 pages; with English translation).
CIPO Office Action for Application No. CN201780077474.8 dated Apr. 26, 2021 (17 pages; with English translation).
Chinese Office Action dated Jun. 2, 2021 for Application No. CN201780077017.9 (17 pages; with English machine translation).
Japanese Notification of Reasons for Rejection dated Jun. 1, 2021 for Application No. JP2019-531944 (14 pages with English machine translation).
Japanese Notification of Reasons for Rejection dated Jun. 8, 2021 for Application No. JP2019-531957 (13 pages with English machine translation).
Japenese Patent Office Notice of Reasons of Refusal for Application No. JP 2019-531967 dated Jun. 8, 2021 (8 pages; with English machine translation).
Notification of Reasons for Refusal for Application No. JP2019-532012 dated Jun. 22, 2021 (6 pages; with English machine translation).
Notification of Reasons for Refusal for Application No. JP2019-527330 dated Jun. 22, 2021 (10 pages; with English machine translation).
JPO Office Action for Application No. JP2019-531097 dated Jun. 29, 2021 (10 pages; with English machine translation).
JPO Office Action for Application No. 2019-531096 dated Jul. 6, 2021 (9 pages; with English machine translation).
JPO Office Action for Application No. 2019-531098 dated Jul. 6, 2021 (5 pages; English translation only).
JPO Office Action for Application No. 2019-531459 dated Jul. 6, 2021 (8 pages; with English machine translation).
JPO Office Action dated Jul. 3, 2021 for Application No. JP2019-532024 (12 pages; with English machine translation).
Non-Final Office Action dated Aug. 27, 2021 for U.S. Appl. No. 16/468,695 (149 pages).

\* cited by examiner

COATING DEVICE FOR APPLYING COATING AGENT IN A CONTROLLED MANNER

CROSS-REFERENCE TO RELATED APPLICATIONS

This application is a national stage of, and claims priority to, Patent Cooperation Treaty Application No. PCT/EP2017/081098, filed on Dec. 1, 2017, which application claims priority to German Application No. DE 10 2016 014 956.6, filed on Dec. 14, 2016, which applications are hereby incorporated herein by reference in their entireties.

BACKGROUND

The disclosure concerns a coating device for coating components with a coating agent, in particular for painting motor vehicle body components with a paint. Furthermore, the disclosure concerns a corresponding operating method for such a coating device.

For the serial painting of motor vehicle body components, rotary atomizers are usually used as application devices, which have the disadvantage of a limited application efficiency, i.e. only a part of the applied paint is deposited on the components to be coated, while the rest of the applied paint has to be disposed of as so-called overspray.

Other known atomizer types are air atomizers, airless atomizers, airmix atomizers and air-assist atomizers. However, these atomizer types also have the disadvantage that a spray mist is emitted so that unwanted overspray occurs when coating.

A newer development line, on the other hand, provides for so-called printheads as application equipment, such as those known from DE 10 2013 002 412 A1, U.S. Pat. No. 9,108,424 B2 and DE 10 2010 019 612 A1. In contrast to the known rotary atomizers, such printheads do not emit a spray of the paint to be applied, but rather a narrowly confined paint jet or—e.g. at edges or edge areas—a droplet jet which is deposited almost completely on the component to be painted, so that almost no overspray occurs.

With the well-known printheads, the paint is supplied either unpressurized, self-priming, purely physically according to the principle of communicating tubes or a paint container under pressure. However, these different types of paint supplies are disadvantageous for various reasons.

In the case of self-priming paint supplies, the delivery volume and thus also the output volume is limited to values of less than 1 ml/min.

In the case of pressure conveying, on the other hand, the conveying volume can be influenced by changing boundary conditions, such as filters or hoses that become clogged, changes in the cross-section of crushed, bent or twisted hoses, which can occur, for example, when hoses are laid in a painting robot or in the case of blocked nozzles or channels in the printhead.

As state of the art printheads are particularly capable of ejecting inks with a viscosity of <15 mPas, the above mentioned delivery methods work sufficiently well. Due to the considerably higher viscosity of coating agents, such as paints, these methods are not sufficient to ensure a constant coating agent delivery volume.

However, in the series painting of vehicle body components, high-quality coatings are applied, which can only be achieved with a constant application rate of the respective coating agent (e.g. paint, adhesive, sealant, primer). The disturbing influence of the above mentioned factors, however, increases with the viscosity of the coating agent.

Furthermore, it should be noted that the viscosity of paints for painting vehicle body components is so high that, together with the application rate and the tube and hose lengths between the paint reservoir and the application device, a pressure is applied that is large enough to convey sufficient paint to the applicator. The viscosity of the paint can vary greatly and depends on several parameters, such as temperature and shear.

When the well-known printheads are used as an application device in the series painting of vehicle body components, the paint supply is therefore still unsatisfactory in practice.

With regard to the technical background of the disclosure, reference should also be made to DE 10 2014 013 158 A1, DE 10 2008 053 178 A1, DE 10 2009 038 462 A1, DE 10 2006 021 623 A1, JP 2013/188 706 A and U.S. Pat. No. 6,540,835 B2.

DETAILED DESCRIPTION

Generally, disclosure includes setting the coating agent pressure and/or the flow rate of the coating agent in a controlled manner in order to produce defined application conditions during the application of coating agents (e.g. paint, adhesive, sealant, primer, etc.) with a printhead so that high-quality coatings can be applied.

The term "coating agent" used in the disclosure is to be generally understood and includes, for example, paints (e.g. water-based paint, solvent-based paint, base coat, clear coat), waxes (e.g. preservative wax), thick materials, sealants, insulating materials and adhesives.

In accordance with the state of the art, the coating device according to the disclosure first has a printhead for applying the coating agent (e.g. paint, adhesive, sealant, primer, etc.) to the component (e.g. motor vehicle body component). The term "printhead" used in the context of the disclosure is to be understood in general and only serves to distinguish from atomizers (e.g. rotary atomizers, disc atomizers, airless atomizers, airmix atomizers, ultrasonic atomizers) which emit a spray of the coating agent to be applied. In contrast, the printhead emits a narrowly confined coating agent jet. Such printheads are known from the state of the art and are described for example in DE 10 2013 092 412 A1, U.S. Pat. No. 9,108,424 B2 and DE 10 2010 019 612 A1.

In addition, the coating device according to the disclosure has a coating agent supply to supply the printhead with the coating agent to be applied, resulting in a specific coating agent pressure and flow rate of the coating agent.

The disclosure now provides that the coating agent supply will control the coating agent pressure and/or flow rate of the coating agent to produce defined application conditions, which is important for the application of high quality coatings.

In an example of the disclosure, the coating agent supply has a metering pump that meters the coating agent and delivers it to the printhead. The term metering pump references that the flow rate is essentially independent of pressure ratios at the inlet and outlet of the metering pump. This means that a defined flow rate can be set according to the control of the metering pump, which is important for high-quality coatings.

For example, the metering pump can be a gear pump, a wobble piston pump or a micro gear pump, to name just a few examples.

Here it is advantageous if the metering pump can be flushed with a flushing agent to flush out coating agent residues from the metering pump. This is particularly advantageous if the metering pump is to be used to pump different colours one after the other. In the case of a colour change, the metering pump can first be flushed with a flushing agent in order to flush out coating agent residues of the old colour from the metering pump. Alternatively, the metering pump can first be blown out and then flushed. The metering pump can also be cleaned alternately with flushing agent and pulsed air.

Alternatively, within the scope of the disclosure, there is the possibility that the coating agent supply has a piston metering unit in order to supply the coating agent in a controlled manner. The coating agent is pressed out of a cylinder by a sliding piston so that the piston position directly determines the amount of coating agent applied.

The piston metering unit can, for example, be arranged on or in the applicator (printhead), before of the robot hand axis, behind the robot hand axis, on the distal robot arm (“Arm 2”) or on the proximal robot arm (“Arm 1”), travelling on a linear traversing axis, on the cabin wall of the painting cabin or outside the painting cabin.

Another variant of the disclosure, on the other hand, provides for a cartridge dispenser with a cartridge filled with a coating agent, with a cartridge outlet for dispensing the coating agent and a cartridge inlet for introducing a displacement fluid which displaces the coating agent contained in the cartridge and ejects it through the cartridge outlet. The flow rate of the coating agent at the printhead can be precisely controlled by controlling the displacement fluid introduced into the cartridge (e.g. solvent first, then compressed air) so that defined application conditions can also be set in this way.

In another variant of the disclosure, the coating agent supply has a coating agent reservoir (e.g. ring line) in order to supply the coating agent to be applied, the defined application conditions being set by a pressure regulator which regulates the coating agent pressure. A pressure sensor can also be provided to measure the coating agent pressure, whereby the measured quantity of the coating agent pressure can then be made available to the pressure regulator.

In one example, the coating agent supply has a coating agent pump to convey the coating agent to the printhead. The coating agent pump is preferably a metering pump in the sense described above, but in this example another type of pump can be used as a coating agent pump.

Furthermore, the coating agent supply in this example has a pressure sensor which measures the coating agent pressure at the printhead, i.e. upstream of the printhead, inside the printhead or directly at a nozzle of the printhead or at the metering pump.

In the case of a pressure regulator, this example also has a flow measuring cell which measures the flow rate from the coating agent pump to the printhead, in particular the volume flow or mass flow of the coating agent being pumped.

Finally, this example has a controller which controls the coating agent pump as a function of the measured coating agent pressure and/or as a function of the measured flow rate of the coating agent.

Furthermore, in this example a bypass line is may be provided in order to bypass the coating agent pump. A bypass valve is also provided to control the flow of coating agent through the bypass line. The discharge of coating agent via the by-pass line also allows the pressure conditions at the printhead to be checked and can also be used for flushing and pressing.

The above mentioned controller controls the coating agent pump preferably in dependence on the measured coating agent pressure and/or in dependence on the measured coating agent flow, whereby different control objectives are possible. A control objective provides that the coating agent pressure is controlled to a specified target pressure. Another control objective, on the other hand, provides that the flow rate of the coating agent is controlled to a specified target flow rate.

The controller can therefore preferably be switched between a pressure control mode and a flow control mode. In pressure control mode, the controller adjusts the coating agent pressure to the specified target pressure. In the flow rate control mode, however, the controller adjusts the flow rate of the coating agent to the specified target flow rate.

In this example, a control unit can be used to switch between these two operating modes (pressure control mode and flow rate control mode). Here it may be taken into account that the printhead is partly operated in a stationary state and partly in a transient state. In the stationary state (steady state) no nozzles are opened or closed at the printhead, whereby a preferably constant flow rate of the coating agent should be applied. In the transient state of the printhead, however, nozzle valves are closed or opened, which includes a corresponding dynamic adjustment of the applied quantity flow. The control unit preferably switches the controller to the flow control mode when the printhead is operated in a stationary state in which no nozzle valves of the printhead are opened or closed. The control unit, on the other hand, prefers to switch the controller to the pressure control mode when the printhead is operating in a transient state where nozzle valves of the printhead are dynamically opened or closed.

The controller can calculate the different states in advance on the basis of the coating program, since it is known at any time during the coating process which nozzle is open or closed. Thus, the required coating agent volume flow can be calculated for any point in time or the points in time of the changeover from volume control operation to pressure control operation can be calculated. This significantly increases the dynamics of the control system.

In addition, the control unit can also control the aforementioned bypass valve depending on the stationary or transient state of the printhead.

In another example of the disclosure, the coating agent supply has a coating agent supply (e.g. ring line), a coating agent return (e.g. ring line) and a pressure actuator (e.g. control valve, pressure regulator) which adjusts the coating agent flow from the coating agent supply to the coating agent return. The return preferably leads the coating agent back to reuse, e.g. back to the ring line, to the paint tank or to another applicator. In addition, the coating agent supply in this example has a coating agent outlet (e.g. nozzle of the printhead) which can be connected to the coating agent supply or is connected to the coating agent supply.

In this example, the pressure actuator—as already briefly mentioned above—can be designed as a return pressure regulator which adjusts the coating agent flow into the coating agent return and thereby regulates the coating agent pressure flow upwards upstream of the return pressure regulator and thus also at the coating agent outlet to the specified target pressure.

Alternatively, as briefly mentioned above, it is possible for the pressure actuator to be a controllable return valve which adjusts the flow of coating agent to the coating agent return in order to establish defined application conditions at the coating agent outlet. As described above, the controller can also calculate the position of the return valve in advance and thus increase the control dynamics.

In another variant of this example, the pressure actuator is a double-acting control valve which, depending on its valve position, either connects the coating agent supply with the coating agent outlet and closes the coating agent return, or connects the coating agent supply with the coating agent return and closes the coating agent outlet. The supplied flow of coating agent is thus directed from the pressure actuator either into the coating agent return or through the coating agent outlet, so that the flow of coating agent conveyed can remain constant in quantity and only the direction of the coating agent flow is changed, namely either into the coating agent return or through the coating agent outlet. For example, the double-acting control valve may then have a dumbbell-shaped or rocker-shaped valve element.

This double-acting control valve may be located in the printhead. However, it is also possible for the double-acting control valve to be located upstream of the printhead.

It should also be mentioned that the coating agent outlet controlled by the double-acting control valve may be a nozzle opening of the printhead. In this case, the double-acting control valve is located directly at the nozzle opening.

It should also be mentioned that the double-acting control valve has the same free flow cross-section to the coating agent return and to the coating agent outlet, resulting in the same flow resistance in both valve positions.

In a another example, the coating agent supply for conveying the coating agent has a coating agent pump with an adjustable flow rate, in particular a metering pump. The nozzle head has several coating agent nozzles for dispensing the coating agent, whereby a nozzle valve is assigned to each individual coating agent nozzle, so that the individual coating agent nozzles can be individually controlled. In addition, a control unit is provided for setting the delivery rate of the coating agent pump, the control unit determining the number of open nozzle valves and setting the delivery rate of the coating agent pump as a function of the number of open nozzle valves. The control unit can determine the number of open nozzle valves, for example by interrogating the control signals for the individual nozzle valves or as described above. The flow rate of the coating agent pump is then adjusted according to the required flow rate depending on the number of open nozzle valves. It should be noted that the control unit preferably has a very short response time of less than 100 ms, 60 ms, 10 ms, 1 ms, 100 µs or even less than 10 µs in order to be able to react sufficiently quickly to the dynamic opening and closing of the individual nozzle valves.

Another way to control the application conditions on the printhead is to provide a buffer reservoir that holds the coating agent and buffers pressure fluctuations of the coating agent.

The buffer reservoir may be located directly in the printhead in order to buffer pressure fluctuations as effectively as possible. Alternatively, it is also possible to place the buffer reservoir outside the printhead and upstream of the printhead.

For example, the buffer reservoir can be realized by a cylinder with a movable piston, whereby the piston can be pretensioned by a spring, compressed air, an electric actuator, a piezoelectric actuator or a magnetic actuator.

It should also be mentioned that the printhead is preferably moved over the surface of the component to be coated by a manipulator (e.g. painting robot) with a serial robot kinematics along a programmed movement path at a certain drawing speed. When passing over a component edge, the individual coating agent nozzles of the printhead are then be closed or opened one after the other, which also requires a corresponding dynamic adjustment of the delivery rate of the coating agent pump. It should be noted that the required reaction time of the coating agent pump depends on the drawing speed of the printhead and on the distance of the adjacent coating agent nozzles along the programmed path of movement. The coating agent pump therefore preferably has a sufficiently short time constant, whereby the time constant of the coating agent pump indicates the time span which elapses with a change in the desired flow rate until 63.2% (1-1/e) of the desired change in the flow rate has been implemented. The following formula is therefore preferable:

$$s > v \cdot \tau$$

with:
s: distance of the adjacent coating agent nozzles in the printhead along the programmed movement path,
v: drawing speed of the printhead along the programmed robot path,
τ: time constant of the coating agent pump.

However, it should be taken into account that the distance of the adjacent coating agent nozzles along the programmed path of movement can also be influenced by a rotation of the printhead. Thus, the coating agent nozzles are usually arranged along a nozzle line in the printhead, where the printhead with the nozzle line is rotatable relative to the programmed trajectory, so that the nozzle line with the programmed trajectory includes a printhead angle. The printhead may then be rotated and moved in such a way that the following formula applies:

$$v \cdot \tau < s = d \cdot \cos \alpha$$

with:
s: Distance of the adjacent coating agent nozzles in the printhead along the programmed movement path,
d: distance of the adjacent coating agent nozzles along the nozzle line, v: drawing speed of the printhead along the programmed robot path, τ: time constant of the coating agent pump, α: rotation angle between the nozzle line and the programmed trajectory of the printhead.

In general it should be mentioned that the printhead emits a narrowly limited jet of coating agent in contrast to a spray mist, as is the case with rotary atomizers, for example.

For example, the printhead can emit a droplet jet or even individual droplets in contrast to a jet of coating agent that is connected in the longitudinal direction of the jet.

Alternatively, however, there is also the possibility that the printhead emits a coating agent jet being continuous in the longitudinal direction of the jet, in contrast to the droplet jet mentioned above.

The control of the coating agent pressure according to the disclosure is preferably carried out with a maximum fluctuation range of ±500 mbar, ±200 mbar, ±100 mbar or even ±50 mbar at the most.

It should also be mentioned that the printhead preferably has an application efficiency of at least 80%, 90%, 95% or even 99%, so that essentially the entire applied coating agent is completely deposited on the component without overspray.

The printhead preferably enables a surface coating performance of at least 0.5 m²/min, 1 m²/min, 2 m²/min or at least 3 m²/min, i.e. the printhead can coat a corresponding component surface within the specified time period.

It should also be mentioned that the flow rate of the applied coating agent and thus the exit speed of the coating agent is preferably adjusted in such a way that the coating agent does not bounce off the component after hitting it.

For example, the exit velocity of the coating agent can be in the range of 5 m/s to 30 m/s.

The application distance between nozzle and component surface can, for example, be in the range from 4 mm to 200 mm, especially from 5 mm to 100 mm, 5 mm to 50 mm, 10 mm to 40 mm.

The disclosure also offers various possibilities with regard to the applied coating agent. Preferably, however, the coating agent is a paint, such as a base coat, a clear coat, an effect paint, a mica paint or a metallic paint. For example, these coatings can be water-based or solvent-based.

To eject the coating agent to be applied, the printhead may have at least one electrically controllable actuator, such as a magnetic actuator or a piezo actuator. Pneumatic valves or drives are also conceivable.

The disclosure also includes a corresponding operating method, whereby the individual steps of the operating method according to the disclosure are already apparent from the above description of the coating device according to the disclosure and therefore do not have to be described in more detail.

Figure 1A:
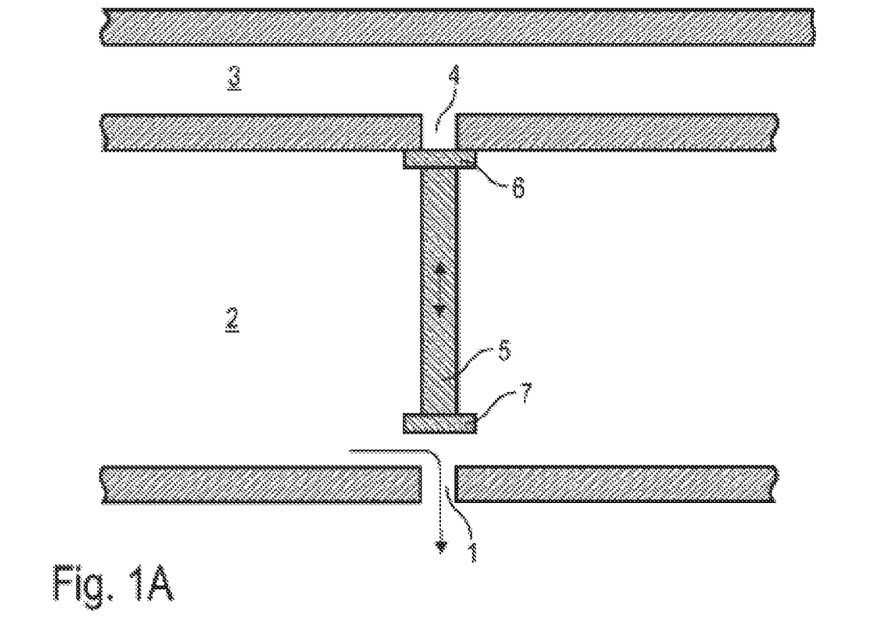
FIG. 1A shows a schematic diagram of a double-acting control valve for controlling the paint flow through a nozzle of the printhead in an open position, FIG. 1B the double acting control valve according to FIG. 1A in a closed position, FIG. 2 a schematic representation of a coating device according to the disclosure having a control valve for returning coating agent from the printhead, wherein the control valve is controlled in dependence on the pressure at the printhead.
Figure 1B:
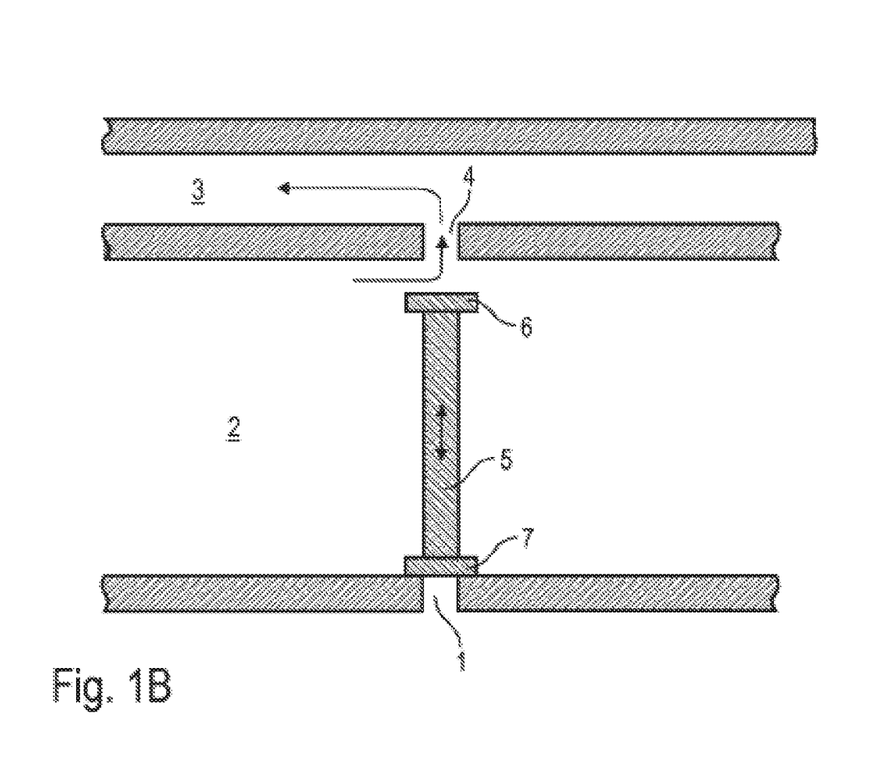

In the following, FIGS. 1A and 1B are first explained, which show a double acting nozzle valve in a nozzle head of a coating device according to the disclosure, whereby the nozzle valve either releases (FIG. 1A) or blocks (FIG. 1B) the coating agent flow through a nozzle 1 in the printhead.

The coating agent to be applied is fed into the printhead via a coating agent feed 2 and can either leave the nozzle head through the nozzle 1 or be returned to a coating agent return 3 depending on the position of the nozzle valve, the flow path from the coating agent feed 2 to the coating agent return 3 leading through a return opening 4 which is either released (FIG. 1B) or blocked (FIG. 1A) by the control valve.

The control valve is only schematically shown here and has a valve needle 5 which can be shifted in the direction of the double arrow by an actuator not shown (e.g. solenoid actuator).

A seal 6, 7 is fitted to each of the two opposite ends of the valve needle 5 in order to be able to close the nozzle 1 or the return opening 4.

In the valve position shown in FIG. 1A, the control valve closes the return opening 4 with the seal 6 so that no coating agent can flow from the coating agent feed 2 to the coating agent return 3.

Instead, the control valve releases the nozzle 1 so that coating agent can escape from the coating agent feed 2 through the nozzle 1.

In the valve position shown in FIG. 1B, however, the control valve with the seal 6 releases the return opening 4 so that coating agent can flow from the coating agent feed 2 into the coating agent return 3.

In this valve position, on the other hand, the control valve closes the nozzle 1 with the seal 7 so that no coating agent can escape from the nozzle 1.

The control valve is therefore double-acting, since the control valve controls not only the coating agent flow through the nozzle 1, but also the coating agent flow from the coating agent feed 2 to the coating agent return 3.

It should be mentioned here that the return opening 4 essentially has the same free flow cross-section as the nozzle 1 and thus also has the same flow resistance. This means that the coating agent flow through the coating agent feed 2 is not influenced by the position of the control valve, since the coating agent flow supplied is discharged either through the return opening 4 or through the nozzle 1 without changing the flow resistance. This is advantageous because switching the control valve will not result in unwanted pressure surges which could affect the coating quality. The recirculation should generate a similar back pressure or be almost pressureless so that the flow conditions remain constant.

Figure 2:
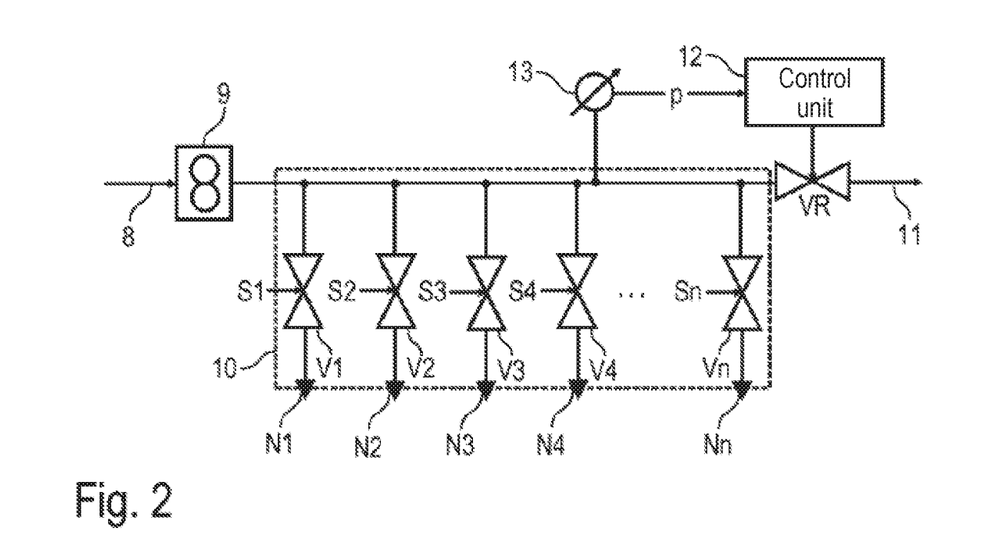

FIG. 2 shows a schematic representation of a coating device according to the disclosure with a coating agent feed 8, which can be connected, for example, to a ring line and supplies a metering pump 9 with the coating agent to be applied. The metering pump 9 delivers the coating agent to be applied at a defined flow rate to a printhead 10 with numerous nozzles N1, N2, N3, N4, . . . , Nn, where each nozzle N1-Nn is assigned a control valve V1-Vn in order to control the coating agent flow through the respective nozzle N1-Nn.

The control valves V1-Vn are each individually controlled by control signals S1-Sn, whereby the generation of the control signals S1-Sn is not shown here for simplification.

In addition, the coating device shown has a coating agent return 11 in order to circulate unneeded coating agent or to divert it into a return.

The coating agent flow through the coating agent return is adjusted by a return valve VR, whereby the return valve VR is controlled by a control unit 12.

In addition, the coating device shown has a pressure sensor 13 which measures the coating agent pressure in the printhead 10, i.e. immediately in front of the nozzles N1-Nn.

The pressure sensor 13 is connected on the output side with the control unit 12, which controls the return valve VR depending on the measured pressure. The aim of controlling the return valve VR by the control unit 12 is to set the coating agent pressure in the printhead 10 as constant as possible, regardless of the valve position of the V1-Vn control valves. Thus, opening the control valves V1-Vn leads to a larger coating agent flow through the respective nozzles N1-Nn, which without countermeasures initially leads to an undesired pressure drop of the coating agent pressure in the printhead 10. The control unit 12 can counteract this by closing the return valve VR accordingly, so that less coating agent is diverted via the coating agent feedback 11. The reduced coating agent flow into the coating agent return 11 then compensates, if possible, for the increased coating agent flow through the open control valves V1-Vn. Ideally, this compensation should be such that the flow of coating agent into the printhead 10 remains constant regardless of the valve position of the control valves V1-Vn, which also results in a constant coating agent pressure in the printhead 10. This compensation therefore leads to a constant coating agent pressure even when the control valves V1-Vn are opened or closed dynamically, thus contributing to a good coating result.

Figure 3:
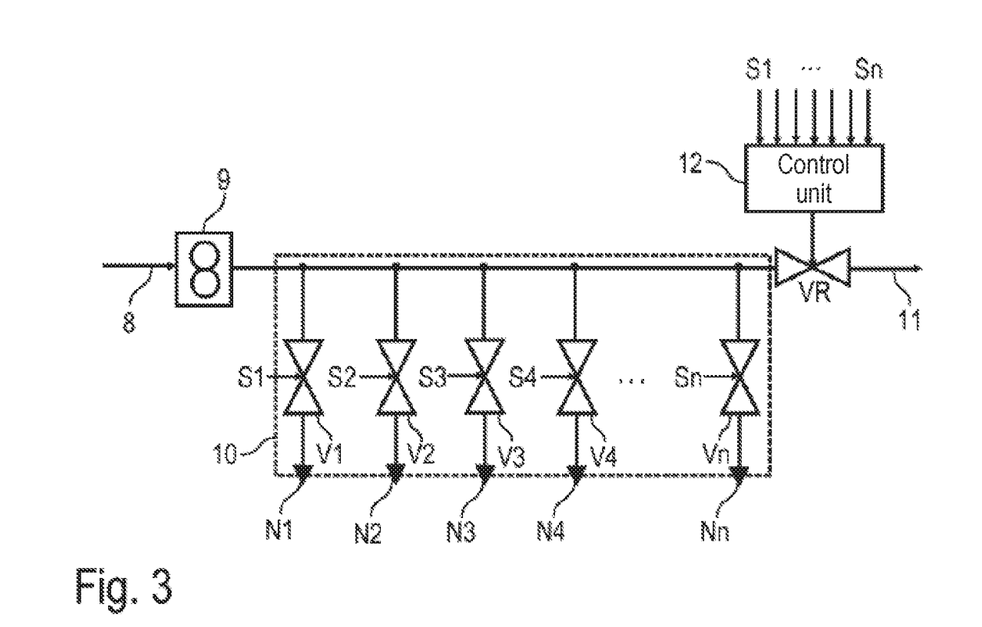
FIG. 3 is a modification of FIG. 2, where the control valve is controlled depending on the valves in the printhead.

The example shown in FIG. 3 largely corresponds to the example described above and shown in FIG. 2, so that reference is made to the above description to avoid repetitions, using the same reference signs for the corresponding details.

One difference between this example and the example shown in FIG. 2 is that the control unit 12 is not connected to the pressure sensor 13, but receives the control signals S1-Sn for controlling the control valves V1-Vn as input signals. The control unit 12 is thus informed about a dynamic opening or closing of the control valves S1-Sn and can react thereupon with a corresponding closing or opening of the return valve VR in order to be able to compensate an increased or reduced coating agent flow through the nozzles N1-Nn by a corresponding opening or closing of the return valve VR in order to keep the coating agent pressure in the printhead 10 as constant as possible.

Figure 4:
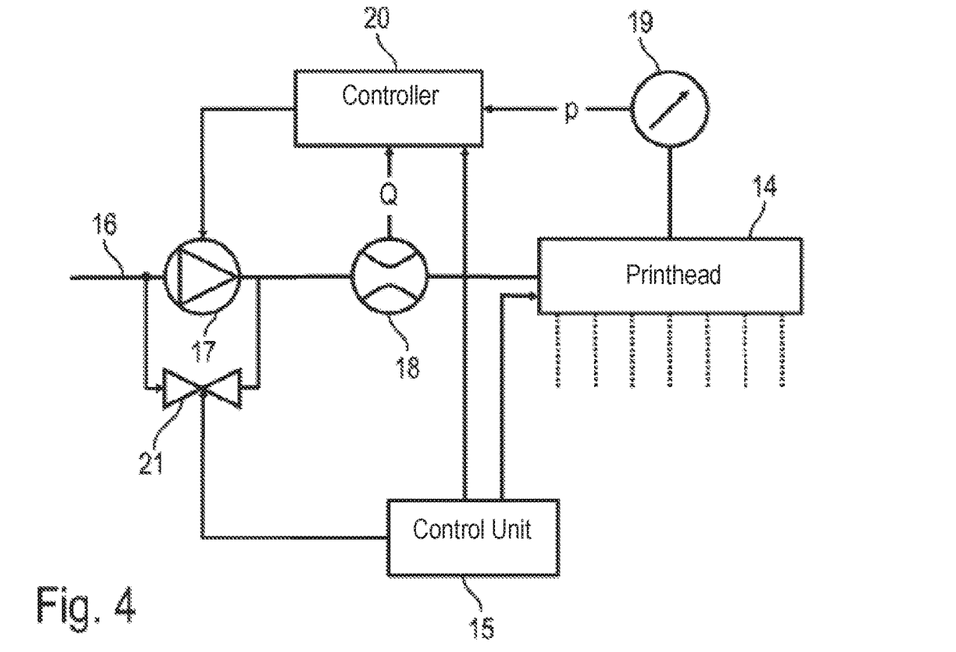
FIG. 4 shows another example with a flow cell and a pressure sensor, FIG. 5 another example with a color changer, FIG. 6 modification of the examples according to FIGS. 2 and 3 with a return pressure regulator, FIG. 7 a modification of FIG. 6 with an additional control unit to control the metering pump, FIG. 8 a modification of FIG. 6 with an additional buffer reservoir in the printhead, FIG. 9 a schematic diagram to illustrate the rotation of the printhead during movement, and FIG. 10 a pressure diagram to illustrate the response behavior of the coating agent pump.

FIG. 4 shows another example of a coating device according to disclosure with a printhead 14 with numerous control valves controlled by a control unit 15.

The coating agent to be applied is supplied to the printhead 14 via a coating agent feed 16, a metering pump 17 and a flow measuring cell 18, whereby the flow measuring cell 18 measures the flow rate Q of the coating agent.

In addition, the coating device has a pressure sensor 19 which measures the coating agent pressure p in the printhead 14.

The pressure sensor 19 and the flow measuring cell 18 are connected on the output side to a controller 20 which controls the metering pump 17.

In addition, a bypass valve 21 is provided which is controlled by the control unit 15.

During operation of this coating device, a distinction is made between a stationary state and a transient state.

In the stationary state, no control valves are dynamically opened or closed in the printhead 14, so that the system is in the stationary state.

In the transient state, however, control valves in the printhead 14 are dynamically closed or opened so that the system is not in the stationary state.

Depending on these two states, the controller 20 is then operated either in a flow control mode or in a pressure control mode.

In the pressure control mode, the controller 20 controls the metering pump 17 in such a way that a coating agent pressure p that is as constant as possible is provided at the input of the printhead 14.

In the flow rate control mode, however, the controller 20 controls the metering pump 17 in such a way that the flow rate Q of the coating agent is as constant as possible.

The control unit 15 switches the controller 20 between the pressure control mode and the flow rate control mode in such a way that in the transient state it switches to the pressure control mode, whereas in the stationary state it switches to the flow rate control mode.

Figure 5:
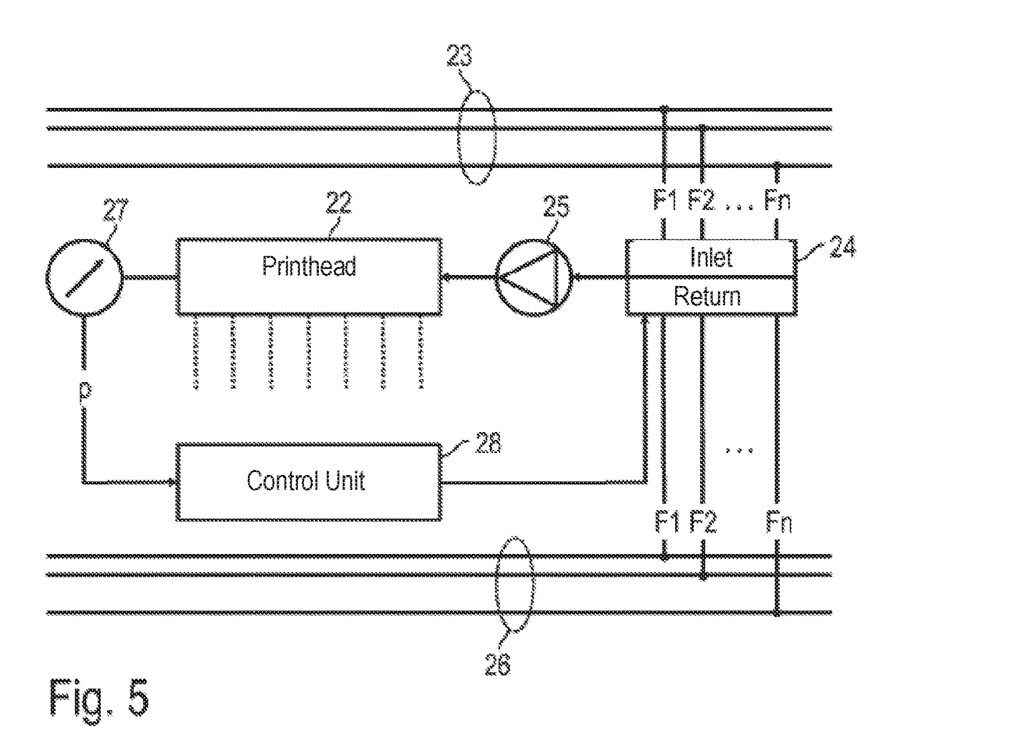

FIG. 5 shows another example of a coating device according to the disclosure with a printhead 22 as application device.

The printhead 22 is supplied with the paint to be coated via a ring line arrangement 23 with several lines for different colours F1, F2, ..., Fn.

The desired color F1-Fn is selected by a color changer 24 from the ring line arrangement 23, whereby the color changer 24 feeds the selected color to a metering pump 25, which feeds the selected coating agent with a defined flow rate to the printhead 22.

In addition, the color changer 24 is connected to a ring line arrangement 26, which forms a coating agent return.

The color changer 24 therefore not only has the function of selecting the desired paint F1-Fn from the ring line arrangement 23 and feeding it to the metering pump 25 and thus also to the printhead 22. Rather, the color changer 24 also has the task of returning excess coating agent to the ring line arrangement 26 depending on the valve position of the control valves in the printhead 22 in order to prevent pressure fluctuations in the printhead 22 as far as possible or if no coating agent of a certain color is required.

In addition, the coating device has a pressure sensor 27, which measures the paint pressure in the printhead 22 or at the metering pump and is connected on the output side to a control unit 28. The control unit 28 now controls the color changer 24 in such a way that pressure fluctuations in the printhead 22 are avoided as far as possible. For this purpose, the control unit 28 opens or closes the return to the ring line arrangement 26 in order to compensate for a dynamic increase or decrease in the applied coating agent flow. The control unit 28 thus ensures controlled printing conditions in the printhead 22, which contributes to a good coating result.

Figure 6:
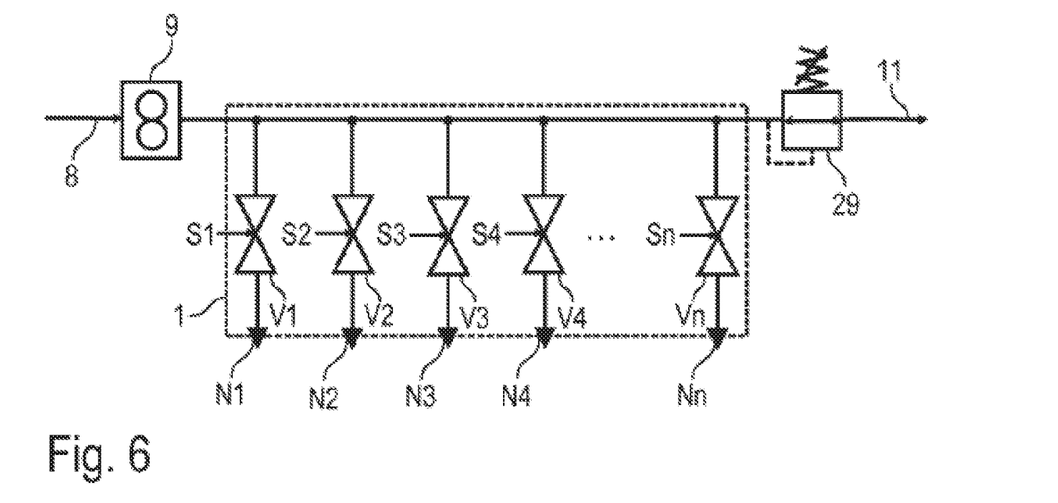

FIG. 6 shows a modification of FIG. 2 so that to avoid repetitions, reference is first made to the above description of FIG. 2, using the same reference signs for corresponding details.

A feature of this example is that a return pressure regulator 29 controls the coating agent flow into the coating agent return 11 instead of the return valve VR. The return pressure regulator 29 regulates the coating agents pressure upstream of the return pressure regulator 29 and thus within the printhead 10 to a specified set pressure. The return flow regulator 29 can compensate for an increase or decrease in the applied coating agent flow if the control valves V1-Vn are opened or closed dynamically. Thus the return pressure regulator 29 ensures an essentially constant coating agent pressure in the printhead 10.

Figure 7:
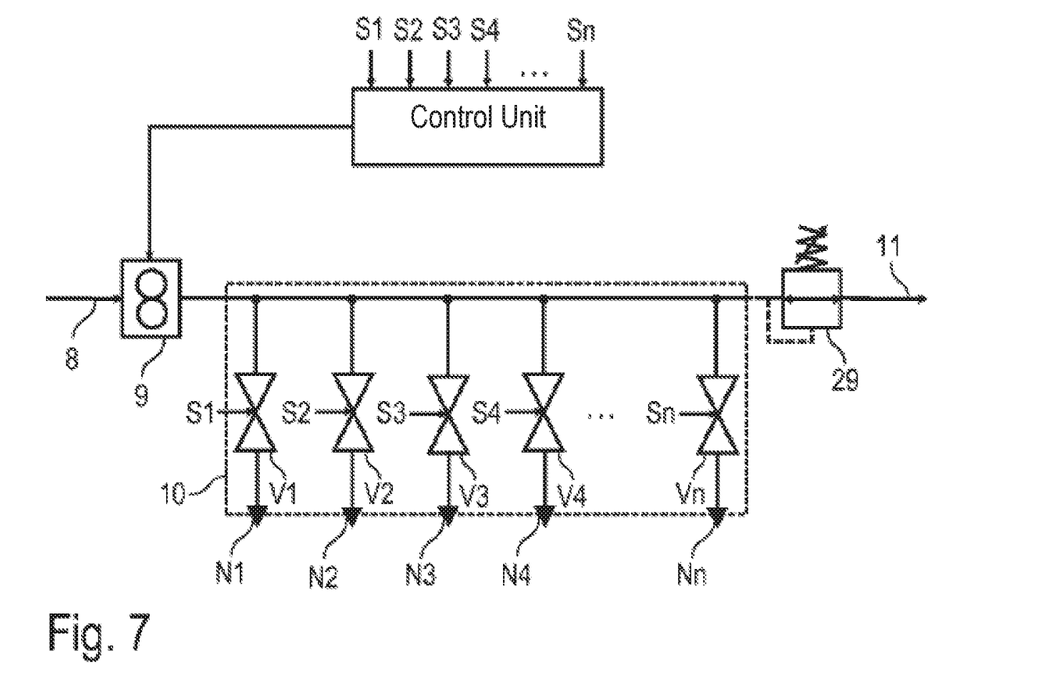

FIG. 7 shows a modification of the example in FIG. 6, so that to avoid repetitions, reference is first made to the above description, using the same reference signs for appropriate details.

A feature of this example is that a control unit 30 controls the metering pump 9 depending on the control signals S1-Sn for the control valves V1-Vn of the printhead 10.

For example, if one or more of the control valves V1-Vn are closed dynamically, the control unit 30 can reduce the flow rate of the metering pump 9 to prevent the coating agent pressure in the printhead 10 from overshooting. In this example, not only does the return pressure regulator 29 contribute to achieving the desired pressure conditions in the printhead 10, but also the control of the metering pump 9 by the control unit 30.

Figure 8:
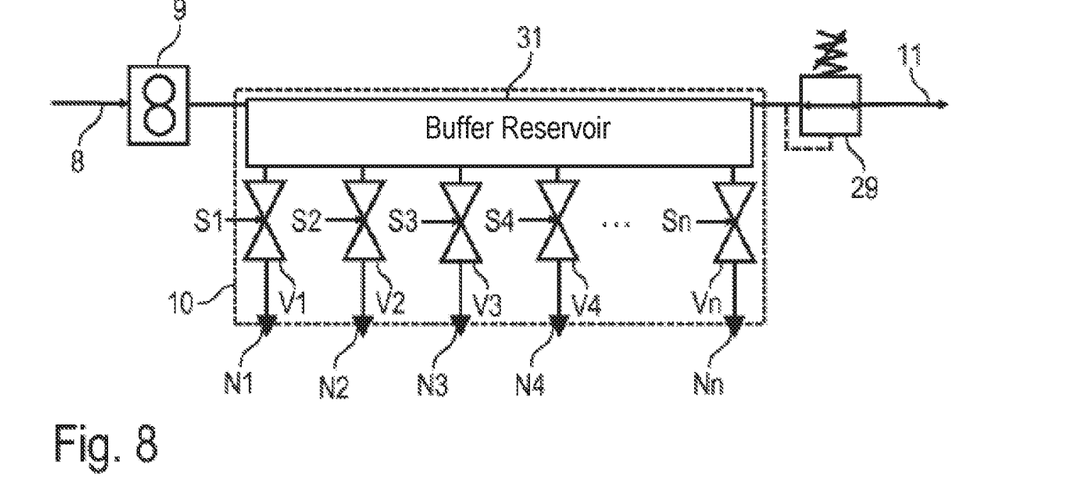

FIG. 8 shows a modification of the example according to FIG. 6, so that to avoid repetitions, reference is first made to the above description, using the same reference signs for the corresponding details.

A feature of this example is that the printhead 10 contains an integrated buffer reservoir 31 which buffers pressure fluctuations in the printhead 10.

For example, the buffer reservoir 31 may have a cylinder with a sliding piston, where the piston can be preloaded by a spring or compressed air.

Due to its buffer effect, the buffer reservoir 31 also contributes to ensuring that no significant pressure fluctuations occur in the printhead 10 even when the control valves V1-Vn are opened or closed dynamically, as these are buffered by the buffer reservoir 31.

Figure 9:
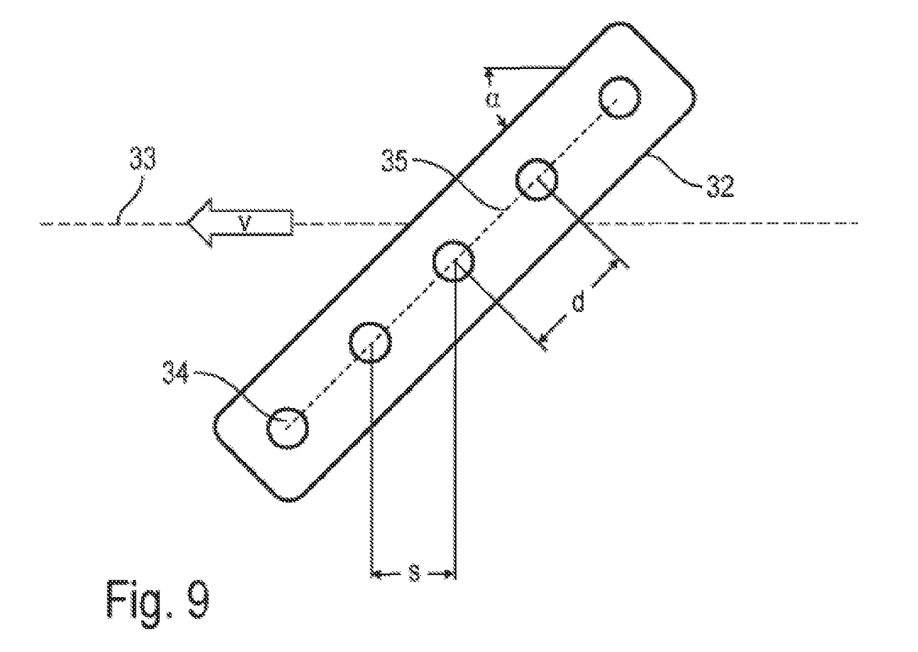
Figure 10:
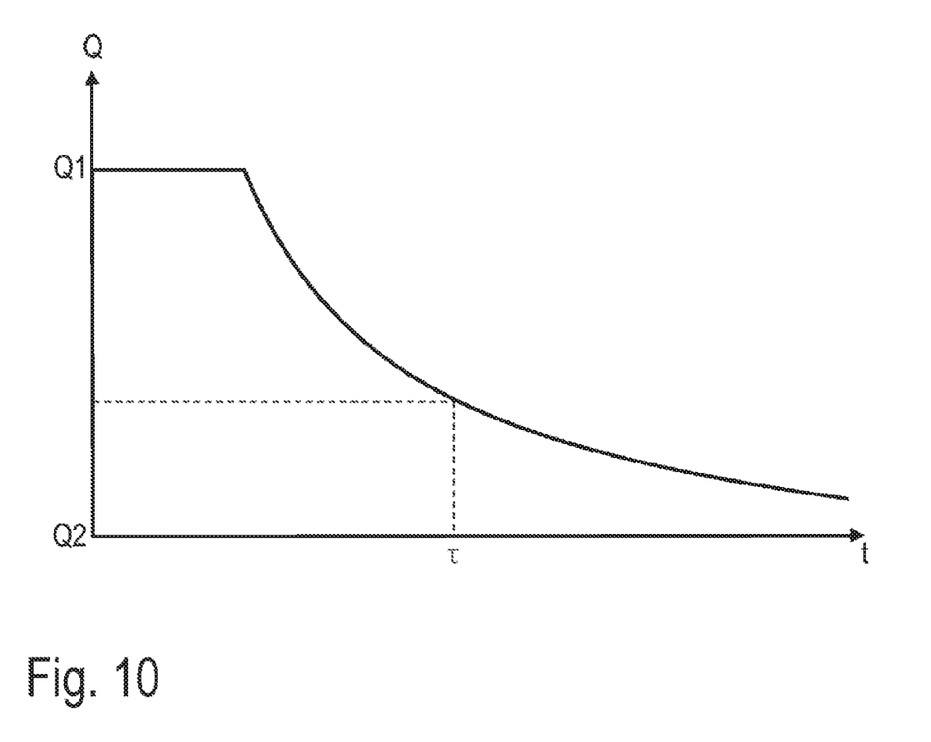

FIGS. 9 and 10 are described below. FIG. 9, for example, shows in very simplified form the movement of a printhead 32 along a programmed movement path 33 over a component surface, whereby the printhead 32 is moved over the component surface by a multi-axis painting robot with a serial robot kinematics or by a machine or a linear unit at a drawing speed v. The printhead 32 is moved over the component surface by a multi-axis painting robot with a serial robot kinematics.

In the printhead 32, several nozzles 34 are arranged next to each other along a nozzle line 35, which is very simplified. The nozzles 34 are arranged along the nozzle line 35 at a distance d from each other.

The nozzle head 32 can be rotated each time by the multi-axis painting robot, whereby the nozzle head 32 with the nozzle li-nie 35 encloses an angle α relative to the programmed movement path 33. Depending on the rotation angle α of the printhead 32, a certain distance s between the adjacent nozzles 34 along the programmed movement path 33 is set.

In the above example the nozzles 34 in the printhead 32 are be closed one after the other as the printhead 32 approaches the boundary of an area to be coated. If the printhead 32 reaches the end of an area to be coated along the programmed trajectory 33, the nozzles 34 of the printhead 32 are closed one after the other from front to rear.

This closing of the nozzles 34 leads to a dynamic reduction of the applied coating agent flow, so that the associated coating agent pump should be shut down accordingly in order to avoid excess coating agent delivery and the associated excess coating agent pressure. However, a coating pump usually has a certain inertia and cannot react immediately to a change in the desired flow rate, but only with a certain delay, as shown in FIG. 10. FIG. 10 shows the change of the desired flow rate from a nominal value Q1 to a lower nominal value Q2. From this it can be seen that the desired change in the flow rate is implemented with a certain time constant τ.

If possible, the coating agent pump should now be able to react so quickly that the coating agent pump with its flow rate can follow the dynamic opening and closing of the nozzles 34 of the nozzle head 32. The coating device should therefore fulfil the following formula:

$$v\cdot\tau < s = d \cdot \cos \alpha$$

with:
s: Distance of the adjacent coating agent nozzles in the printhead along the programmed movement path,
d: distance of the adjacent coating agent nozzles along the nozzle line,
v: drawing speed of the printhead along the programmed robot path,
τ: time constant of the coating agent pump,
α: rotation angle between the nozzle line and the programmed trajectory of the printhead.

If this formula is fulfilled, the coating agent pump can approximately track the amount of coating agent pumped to the dynamic opening or closing of the nozzles 34.

The disclosure is not limited to the examples described above. Rather, a large number of variants and modifications are possible which also make use of the inventive idea and therefore fall within the scope of protection. The feature of a control of the coating agent pressure or the flow rate of the coating agent is therefore not a necessary feature in the context of the further aspects of disclosure.

The invention claimed is:

1. A coating device for coating components with a coating agent, comprising:
a manipulator that moves the printhead along a programmed movement path at a predetermined drawing speed;
a printhead supported by the manipulator and having a plurality of coating agent nozzles that eject the coating agent, the plurality of coating agent nozzles include adjacent coating agent nozzles spaced from each other by a distance along the programmed movement path; and
a coating agent supply for supplying the printhead with the coating agent at a specific coating agent pressure and a specific flow rate, the coating agent supply adjusts at least one of the coating agent pressure and the flow rate of the coating agent in a controlled manner, the coating agent supply includes a coating agent pump that delivers said coating agent to said printhead, the coating agent pump defines a time constant that is a period of time which elapses between a change in desired delivery quantity and a time at which 63.2% of the desired change in delivery quantity has been implemented;
wherein the distance between the adjacent coating agent nozzles spaced along the programmed movement path is greater than the predetermined drawing speed of the printhead along the programmed movement path multiplied by the time constant defined by the coating agent pump.

2. The coating device according to claim 1 wherein:
the printhead is rotatable relative to the programmed movement path;
the plurality of coating agent nozzles are arranged in the printhead along a nozzle line, and the nozzle line and the programmed movement path define a printhead angle; and
the distance between the adjacent coating agent nozzles spaced along the programmed movement path is equal to a distance between the adjacent coating agent nozzles along the nozzle line multiplied by a cosine of the printhead angle.

3. The coating device according to claim 1, wherein the coating agent pump is a metering pump which meters and delivers the coating agent to the printhead so that the flow rate is substantially independent of pressure conditions at the inlet and outlet of the metering pump.

4. The coating device according to claim 1, further comprising a pressure sensor which measures the coating agent pressure, and a flow measuring cell which measures the flow rate, and a controller which controls the metering pump as a function of the measured coating agent pressure and as a function of the measured flow rate of the coating agent.

5. The coating device according to claim 4, further comprising
a) a bypass line for bypassing the metering pump; and
b) a bypass valve controlling the coating agent flow through the bypass line.

6. The coating device according to claim 4, wherein the controller controls the metering pump as a function of the measured coating agent pressure and as a function of the measured coating agent flow to control the coating agent pressure to a pre-set target pressure.

7. The coating device according to claim 4, wherein the controller controls the metering pump as a function of the measured coating agent pressure and as a function of the measured coating agent flow to control the flow rate of the coating agent to a predetermined target flow rate.

8. The coating device according to claim 4, wherein
a) the controller is switchable between a pressure control mode and a flow rate control mode,
b) the controller regulates the coating agent pressure to a predetermined target pressure in the pressure control mode, and
c) the controller regulates the flow rate of the coating agent to a predetermined target flow rate in the flow rate control mode.

9. The coating device according to claim 8, wherein
a) a control unit is provided,
b) the control unit switches the controller between the pressure control mode and the flow rate control mode,
c) the control unit switches the controller to the pressure control mode when the printhead is operated in a transient state in which nozzle valves of the printhead are opened or closed,
d) the control unit switches the controller into the flow rate control mode when the printhead is operated in a stationary state in which no nozzle valves of the printhead are opened or closed; and
e) the control unit controls a bypass valve as a function of the stationary state and the transient state or during a colour change.

10. The coating device in accordance with claim 1, wherein
a) the coating agent supply has a coating agent feed to supply the coating agent,
b) the coating agent supply has a coating agent return to return the coating agent,
c) the coating agent supply has a pressure actuator which adjusts the coating agent flow from the coating agent feed into the coating agent return, and
d) the coating agent supply has a coating agent outlet connected to the coating agent feed.

11. The coating device in accordance with claim 10, wherein the pressure actuator is a return pressure regulator which adjusts the coating agent flow into the coating agent return and thereby regulates the coating agent pressure upstream of the return pressure regulator and thus also at the coating agent outlet to the predetermined desired pressure.

12. The coating device according to claim 10, wherein the pressure actuator is a controllable return valve which adjusts the coating agent flow into the coating agent return.

13. The coating device according to claim 10, wherein the pressure actuator is a double-acting control valve movable from a first position to a second position, the double-acting control valve at the first position connects the coating agent feed with the coating agent outlet and closes the coating agent return, and the double-acting control valve at the second position connects the coating agent feed with the coating agent return and closes the coating agent outlet.

14. The coating device according to claim 13, wherein
a) the double-acting control valve is arranged in the printhead, and
b) the coating agent outlet controlled by the double-acting control valve is a nozzle opening of the printhead, and
c) the double-acting control valve has the same free flow cross-section towards the coating agent return and towards the coating agent outlet.

15. The coating device according to claim 1, wherein
a) the coating agent pump is a metering pump;
b) said printhead comprises a plurality of nozzle valves for controlling the flow of coating agent through said individual coating agent nozzles, and
c) a control unit is provided for setting a delivery rate of the metering pump, the control unit determining the number of opened nozzle valves and setting the delivery rate of the metering pump as a function of the number of opened nozzle valves.

16. The coating device according to claim 1, wherein the coating agent supply comprises a cartridge dispenser having a coating agent-filled cartridge with a cartridge outlet for discharging the coating agent and a cartridge inlet for introducing a displacement fluid which displaces the coating agent in the cartridge and ejects it through the cartridge outlet.

17. The coating device according to claim 1, wherein the coating agent supply comprises a buffer reservoir which receives the coating agent and buffers pressure fluctuations of the coating agent.

18. The coating device according to claim 17, wherein the buffer reservoir has a cylinder with a piston which is displaceable in the cylinder.

19. The coating device according to claim 1, wherein the coating agent pump is a metering pump and further comprising a controller that controls the metering pump to deliver the coating agent to the printhead, the coating agent pressure having a maximum variation of +/−500 mbar.

20. The coating device according to claim 19, wherein the controller controls the metering pump to deliver the coating agent to the printhead such that the specified flow rate provides an exit velocity of the coating agent from the printhead that is at least 5 m/s and at most 30 m/s, and wherein the printhead has an area coating capacity of at least 0.5 m2/min.

* * * * *